United States Patent [19]
Reiter et al.

[11] Patent Number: 6,021,378
[45] Date of Patent: Feb. 1, 2000

[54] COMPRESSION SYSTEM FOR SEISMIC DATA

[75] Inventors: Edmund Reiter, Watertown; Peter Niels Heller, Somerville, both of Mass.

[73] Assignee: Aware, Inc., Bedford, Mass.

[21] Appl. No.: 08/876,044

[22] Filed: Jun. 13, 1997

[51] Int. Cl.[7] .................................................. G06F 7/00
[52] U.S. Cl. ........................... 702/14; 702/6; 364/715.02; 364/421; 364/422
[58] Field of Search .................................. 364/422, 421, 364/715.02; 702/6, 14

[56] References Cited

U.S. PATENT DOCUMENTS 5,745,392  4/1998  Ergas et al. ..................... 364/715.02

OTHER PUBLICATIONS

Y. Shoham and A. Gersho, 'Efficient Bit Allocation for an Arbitrary Set of Quantizers,' IEEE Transactions on Acoustics, Speech, and Signal Processing, vol. 16, No. 9, Sep. 1988, pp. 1445–1451.

*Primary Examiner*—Christine Oda
*Assistant Examiner*—Anthony Jolly
*Attorney, Agent, or Firm*—Cesari & McKenna

[57] ABSTRACT

A method for operating a computer to reduce the memory needed to store seismic data. The seismic measurements are first organized into a multi-dimensional data array. The multi-dimensional data array is than sub-band coded to form a coded data array by applying a one-dimensional transformation corresponding to each dimension of the data array to that dimension of the data array. The transformation is determined by the frequency content of the corresponding dimension of the data array. The sub-band coded data array is then quantized to provide a compacted data array.

8 Claims, 1 Drawing Sheet

COMPRESSION SYSTEM FOR SEISMIC DATA

FIELD OF THE INVENTION

The present invention relates to data compression systems, and more particularly, to systems for compressing the seismic data sets of the type used in exploration for oil and other minerals.

BACKGROUND OF THE INVENTION

Oil and other minerals are associated with specific types of underground formations. Hence, one method for locating potential drilling sites relies on mapping the formations. In this method, explosions are set off on the surface and the amplitude of the shock waves reflected from the various underground formations are recorded at a number of sites on the surface. The raw seismic data sets generated in such explorations typically require several hundred Gigabytes to store. Hence, these data sets are difficult to store and transmit. For example, satellite-based networking links to remote exploration sites have bandwidths from 9.5 Kilobits/sec to 128 Kilobits/secs. Hence, without some form of data compression, cost-effective, real time delivery of data to quality control and data processing centers remote from the exploration site is not feasible. Compression ratios between 10:1 and 100:1 are typically needed.

Compression systems can be divided into systems that exactly reproduce the original data after decompression, "lossless" systems and systems in which the decompressed data differs slightly from the original data. Historically, lossless systems have been used for seismic data compression. Unfortunately, lossless data compression systems are limited to compression ratios of less than 4:1.

Compression systems that make small errors in the decompressed data have been used extensively in image compression systems. Such systems can provide compression ratios in the range of 50:1. One compression system of this type is referred to as sub-band coding. In this system, the image is decomposed into a plurality of component images representing the data content of the original image in different ranges of spatial frequencies. The various component images are then coded with different precision depending on the amount of information contained in each component image. To the extent that one or more of these component images has a disproportionate share of the information in the image, image compression can be achieved. In the case of photographs, most images of interest to human observers have the relevant information concentrated in low spatial frequencies. Hence, such image compression systems provide high compression ratios with satisfactory image quality.

Broadly, it is the object of the present invention to provide an improved data compression system for seismic data.

These and other objects of the present invention will become apparent to those skilled in the art from the following detailed description of the invention and the accompanying drawings.

SUMMARY OF THE INVENTION

The present invention is a method for operating a computer to reduce the memory needed to store seismic data. The seismic measurements are first organized into a multi-dimensional data array. The multi-dimensional data array is than sub-band coded to form a coded data array by applying a one-dimensional transformation corresponding to each dimension of the data array to that dimension of the data array. The transformation is determined by the frequency content of the corresponding dimension of the data array. The sub-band coded data array is then quantized to provide a compacted data array.

DETAILED DESCRIPTION OF THE INVENTION

Figure 1:
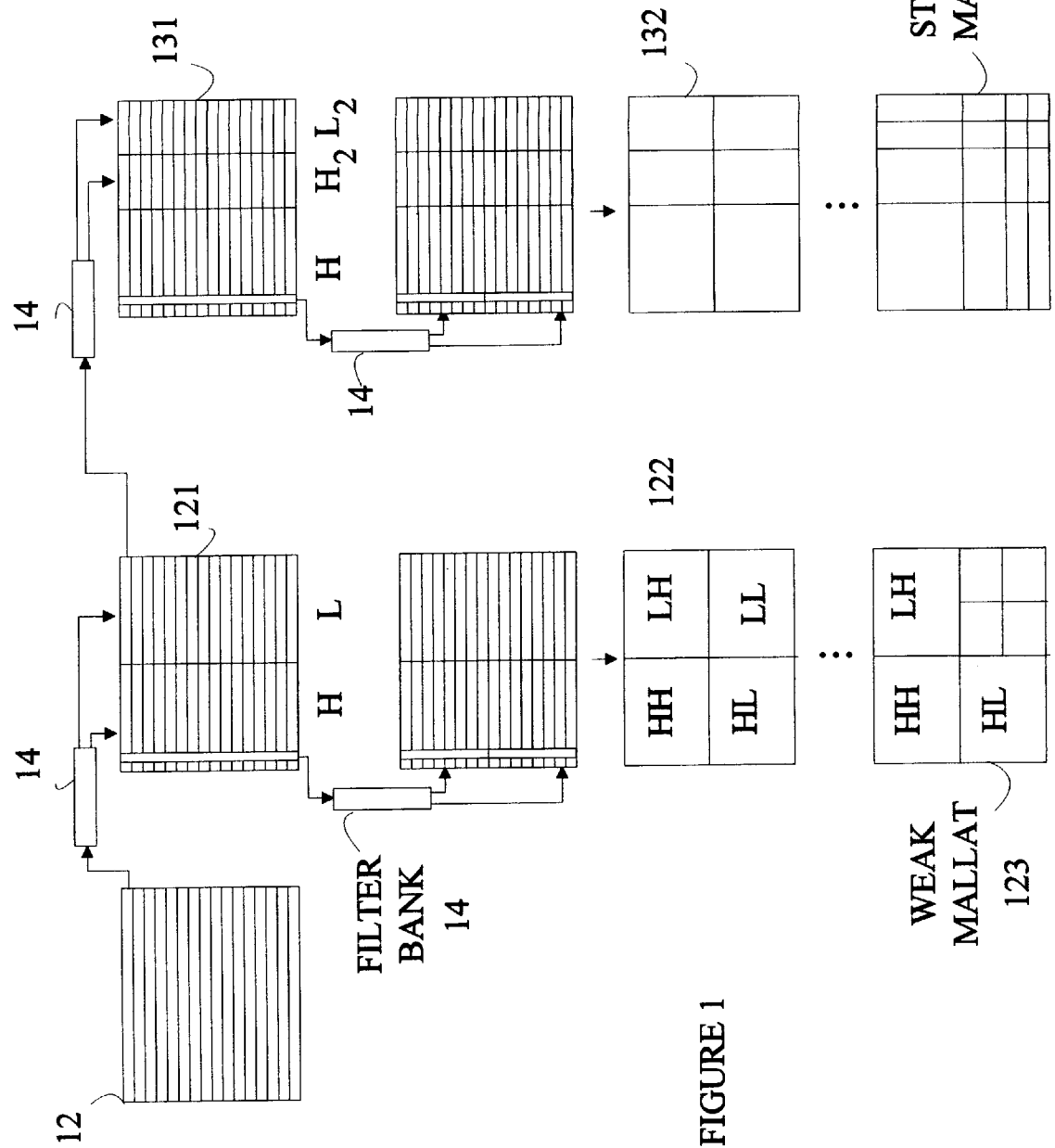
FIG. 1 illustrates the sub-band coding of a dataset via the Strong and Weak Mallat algorithms.

The seismic datasets of interest are typically three-dimensional in nature. However, it will be apparent to those skilled in the art from the following discussion that the method of the present invention may be applied to higher dimensional data sets. The datasets typically represent the observed seismic reflections at various points in a two-dimensional array as a function of time. Hence, they can be represented as a three-dimensional array of values (x,y,z) where z represents the time at which the data was observed after the explosion.

The data compression system of the present invention processes this three-dimensional image by using a three-dimensional sub-band filter system to generate a plurality of three-dimensional sub-arrays. At least one of the component sub-arrays is quantized by approximating the sub-array values therein by an integer value constrained to lie between predetermined limits. The precision of this approximation depends on the statistical distribution of the sub-array values and on the specified compression ratio. The quantized sub-arrays may then be coded using known coding schemes that provide additional lossless compression of the sub-arrays.

The three-dimensional component images are obtained by iteratively applying a one dimensional "filter"Consider the dataset values along the x-direction for fixed values of y and z. This one dimensional array may be viewed as a signal, x[i], that has been sampled at M points, where M is the number of points in the x-direction in the array. This signal can be filtered to obtain M/2 values representing the frequency content of the signal in a particular frequency range by convolving the signal with an analysis filter sequence. In the present invention, two filters are applied to the signal to generate high and low frequency component signals, $S_H$ and $S_L$, where $$S_L(2m) = \sum_{k=0}^{N_1-1} h_0[k]x[2m - N_1 - k] \quad (1)$$

and $$S_H(2m-1) = \sum_{k=0}^{N_2-1} h_1[k]x[2m - N_2 - k] \quad (2)$$

Here, m runs from 0 to M/2−1, where M is the number of sample points in the input signal x. $N_1$ and $N_2$ are the lengths of the filter sequences. It should be noted that Eqs. (1) and (2) reference points that are outside of the array of values x[i]. That is, values for i<0 and i>M−1 are needed to compute the filtered signal values for some values of $S_H$ and $S_L$. There are a number of methods for dealing with the boundaries of a finite-length input signal. When the filters $h_0$ and $h_1$ have linear-phase symmetry (either symmetric or antisymmetric), the input data may be reflected at its edges to produce a pair of transform vectors.

When the filters are orthogonal and M is even then the input signal may be modified such that it is periodic with period M. This yields sub-band outputs with a period of M/2. If M is odd, a single 0 sample is added to one end of the signal to generate an even length (M even) signal. A filter bank is said to be orthogonal if it satisfies the relationship $$\sum_n h_k[n]h_p[n-2l] = \delta_{0,l}\delta_{k,p} \quad (3)$$

Here, $\delta_{ij}=0$ if $i \neq j$ and 1 if $i=j$.

The filter bank consisting of $h_0$ and $h_1$ is referred to as an analysis filter bank since it decomposes the input signal into signals having different frequency content. For any given orthogonal analysis filter bank, one can construct a synthesis filter bank that reproduces the original signal using the relationships:

$$f_0[n] = (-1)^n h_1[N_2-1-n] \quad (4)$$

and $$f_1[n] = (-1)^n h_0[N_1-1-n] \quad (5)$$

It can be shown that a synthesis filter bank will perfectly reconstruct the signal if it is "biorthogonal" at even shifts, i.e., $$\sum_n h_0[n]f_0[n-2l] = 2\delta_{0,l} \quad (6)$$

and $$\sum_n h_0[n]f_1[n-2l] = 0 \quad (7)$$

It should be noted that every orthogonal filter bank is also biorthogonal.

The original signal is reconstructed from the sub-band signals $S_L$ and $S_H$ by upsampling the sub-band signals by two, followed by convolution with the synthesis filters, and summing the two results, i.e., $$\hat{x}[n] = \sum_{k=0}^{N_2-1} f_0[k]S_L[m-N_2-2k] + \sum_{k=0}^{N_1-1} h_1[k]S_H[m-N_1-2k] \quad (8)$$

Here, the reconstructed signal is denoted by $\hat{x}$ to denote that quantization errors in the $S_L$ and $S_H$ may result in errors in the reconstructed signal.

In the paragraphs to follow we will describe an iterative filtering scheme for decomposing the input data into sub-bands. In order for this iterative procedure to converge, the lowpass filters must satisfy the normalization.

$$\sum_n h_0[n] = 2 \quad (9)$$

and $$\sum_n f_0[n] = 2 \quad (10)$$

It is advantageous to use filters of relatively small length. For the purposes of this discussion, it will be assumed that $N_1=N_2=N$. First, the computational workload inherent in analyzing and synthesizing the data arrays is of order $N^3$; hence, the computational workload increases rapidly with N. Second, the number of points in the reconstructed signal that will be altered by a quantization error in one of the transform coefficients is of order N. That is, a quantization error in one of the $S_L$ or $S_H$ values will lead to errors in all of the reconstructed data points within a cubic sub-array of side N.

The simplest filter has N=2, and is known as the Haar filter:

$$h_0=\{1,1\} \quad (11)$$

and $$h_1=\{1,-1\} \quad (12)$$

The filtering operation described above is one dimensional in nature. This operation may be applied to one dimension of the dataset to obtain two rows of half the length representing the low and high frequency components of the original row. To obtain a finer degree of separation by spatial frequency, the one dimensional filtering may be applied again to either, or both, of the resulting frequency components. Different sub-band filtering algorithms utilize different orderings of the filter operation.

Two filtering algorithms utilized in the present invention are referred to as the "Strong Mallat" algorithm and the "Weak Mallat" algorithm. These algorithms differ in the order with which a filter is applied to the dataset. In the Strong Mallat algorithm, the filtering is applied iteratively to each dimension of the dataset before applying filtering to the other dimensions. In the Weak Mallat algorithm, the filtering is applied once to each dimension, and then the process is repeated on the low frequency sub-band.

To simplify the following discussion, a two dimensional dataset will be utilized to describe the two algorithms. Refer now to FIG. 1 which illustrates the sub-band coding of a dataset 12 via the Strong and Weak Mallat algorithms. Both algorithms start by filtering each row of dataset 12 through a filter bank 14 which generates two arrays of half the length representing the high and low frequency components of the row. The two frequency components replace the original row in the array to generate a modified dataset 121.

In the case of the Strong Mallat algorithm, the low frequency component of each row is again filtered through the 14 filter bank to generate two new arrays of one quarter the length of the original row. These two arrays replace each of the low frequency components to generate a new dataset 131. If further division in frequency is required, the process is repeated by filtering the new low frequency components, L2. However, to simplify the figure and this discussion, it will be assumed that the decomposition of the rows stops when dataset 131 is finished. The process is then repeated on each column of dataset 131. Each column is filtered through filter bank 14 to generate high and low frequency components which replace the column in the dataset thereby generating a new dataset 132. The low frequency half of each column of dataset 132 is again filtered to generate the final sub-band coded dataset having 16 sub-bands.

In the case of the Weak Mallat algorithm, the columns of dataset 121 are filtered through filter bank 14 to generate high and low frequency components which replace the columns thereby generating dataset 122. Dataset 122 has 4 sub-bands, labeled LL, LH, HL, and HH. The LL sub-band corresponds to the low frequency components of the columns obtained by filtering the L frequency rows of dataset 121. In the Weak Mallat algorithm, the LL sub-band is treated as if it were a separate dataset of one quarter the size of the original dataset and the algorithm is repeated on this dataset to generate the final Weak Mallat dataset 123 having 7 sub-bands.

The above discussion assumed a one-dimensional transformation that transformed each linear dataset into a single high frequency and single low frequency dataset. Finer frequency divisions are generated by iterating the two sub-band transformations. However, transformations that transform a linear dataset into M components representing the frequencies in M frequency band may also be constructed. Here, M is any integer greater than 2. Such a transform can provide narrow bands in a single transformation applied to each dimension; however, the computational workload is substantially greater than that inherent in either the Weak or Strong Mallat transforms described above.

Sub-band coding in itself does not provide compression. The actual data compression is achieved by quantizing the transformed dataset. The transformed dataset may be viewed as a plurality of sub-datasets. The quantization algorithms typically assign the same number of bits for each element of each sub-dataset. The number of bits assigned to each element depends on the statistical distribution of the elements in each sub-dataset. Algorithms for optimizing the number of bits are known to those skilled in the art, and hence, will not be discussed in detail here. The reader is directed to R. C. Reiter and P. N. Heller, "Wavelet Transform Based Compression of NMO corrected CDP Gathers," Proceedings of the Society of Exploration Geophysicists 64$^{th}$ Annual Mtg., Los Angeles, Cailf. 1994, pp. 731–734, which is hereby incorporated by reference, and to Y. Shoham and A. Gersho, 'Efficient Bit Allocation for an Arbitrary Set of Quantizers,' IEEE Transactions on Acoustics, Speech, and Signal Processing, vol. 16, no. 9, September 1988, pp. 1445–51.

In the present invention, the specific decomposition scheme used in each dimension of the dataset depends on the type of seismic data that is to be compressed. The goal of the decomposition scheme is to transform the dataset into the frequency space in a manner in which the "energy" in the frequency representation is concentrated in as few sub-bands as possible. The sub-bands having the highest energy are then allotted more bits per frequency coefficient than the sub-bands having lower energy. Here, "energy" is represented by the average value of the square of the absolute value of the samples of the sub-band signal.

This goal can only be realized if the frequency representation of the dataset has regions of concentration of power. If there are not narrow band regions, then the goal of the transformation process cannot be met. In general, different dimensions of the dataset will have differing degrees of frequency concentration. In those dimensions in which the dataset is relatively broadband, little is gained by utilizing transformations that provide fine divisions in the frequency space, since all of the divisions will have nearly the same statistical properties. In such broadband regions, computational workload becomes the dominant consideration, since improved compression by utilizing transformations having higher computational workloads is not possible. Accordingly, dimensions of the dataset which are broadband are preferably grouped together to form a dataset of dimension two or greater and transformed using the Weak Mallat transform, since this transform has the lowest computational workload.

If a particular dimension of the dataset exhibits a slow variation, then that dimension has a concentration of power near DC in the frequency domain. Accordingly, the Strong Mallat transform is preferred for such dimensions, since it does a better job of concentrating low frequency data into a few bands.

If a particular dimension of the dataset exhibits a peak in the frequency spectrum at a frequency displaced from zero, then an M component transform would be useful to isolate the peaked frequency region into few sub-bands. Such a transform can also be generated by iterating a two component transform on the frequency component with the highest energy content (sub-band variance)rather than on the low frequency component.

Two types of datasets deserve special consideration. The first is often referred to as a "stacked" dataset. Stacked datasets represent a reflectivity map of the earth's structure. Because of the gradual nature of changes in the earth's structure, this stacked data contains a preponderance of low spatial frequency information with occasional high spatial frequency details. Thus, concentration of the data in only low spatial frequencies in any one dimension is not possible. Accordingly, the Weak Mallat transform algorithm is preferred.

"Shot gather" data may also be compressed utilizing the method of the present invention. This data is characterized by two spatial dimensions (x and y) and time t to provide a three-dimensional data array which is typically a cube. The data is gathered by collecting data from a linear array of receivers which measure the signal amplitude as a function of time after an acoustical pulse is generated. The distance between the receivers defines the x-coordinate. After the time points are collected for each receiver, the array is moved to a new location which is displaced from the previous location by an amount that is small compared to the distance from the receivers to the physical structures providing the reflections being detected by the receivers, and another shot is fired. The new data points are distinguished from the old data points by assigning a new y-coordinate to the new data points. Since the new positions of the receivers differ only slightly from the old positions when viewed in terms of the distances from the receivers to the structures generating the echos, the rate of change of the data with respect to the y-coordinate is very small. That is, the spatial frequencies in the y-direction are concentrated near zero frequency. Accordingly, the Strong Mallat transform is utilized in the y-dimension.

The optimum compression scheme for the x and t dimensions depends on whether the data is compressed in its raw state or after a process called normalized move-out or NMO. NMO is a nonlinear mapping applied after data collection in which hyperbolas in x and t are mapped into straight lines.

Compression of NMO-corrected data is preferably carried out using the Strong Mallat transform tree for the x and t dimensions. The time-bandwidth of the data depends on the frequency of the source pulse used to generate the shot gather, and tends to be quite large. The spatial bandwidth is determined by the earth's structure in the region where data was collected. However, the wavelet transform applied to an NMO-corrected shot gather tends to concentrate spatial energy in the x-dimension at DC, since the NMO transform maps hyperbolic trajectories into straight lines, which appear as very low frequency information. Thus the sub-bands corresponding to high time frequencies and low spatial frequencies have nontrivial signal content. As noted above, this type of data is preferably compressed utilizing a Strong Mallat transform.

In contrast, raw shot gather data retains hyperbolic features in x and t. After being wavelet transformed, these features remain broadband compared to the transformed data in which the energy is concentrated at DC in x. Thus, the higher computational load of a pure Strong Mallat transform is not justified. In the preferred embodiment of the present invention, a Weak Mallat transform is used in x and t. With this approach, even if the shot gather has significant band-pass energy in t or x, the slow variations in y can be exploited by the Strong Mallat in the y dimension to reduce the storage required to store the entire dataset.

The method of the present invention is preferably practiced on a conventional digital computer. However, it will be apparent to those skilled in the art that other computational platforms including those having special purpose hardware for facilating the computation of finite impulse response filters may be utilized. In addition, these algorithms may be implemented directly on custom integrated circuits such as ASICs and FPGAs.

Various modifications to the present invention will become apparent to those skilled in the art from the foregoing description and accompanying drawings. Accordingly, the present invention is to be limited solely by the scope of the following claims.

What is claimed is:

1. A method for operating a computer to reduce the memory needed to store a seismic dataset, said method comprising the steps of:

organizing the seismic dataset into a data array comprising at least three dimensions;

sub-band coding said data array to form a coded data array by applying a one-dimensional transformation to each said dimension of said data array, each said transformation being determined by the spectral distribution of energy in said corresponding dimension of said data array; and quantizing said coded data array.

2. The method of claim 1 wherein said step of sub-band coding comprises the step of identifying dimensions having spectral distributions of energy that are not concentrated at low frequencies, and coding said dimensions utilizing a Weak Mallat transformation to generate a partially coded data array.

3. The method of claim 1 further comprising the step of transforming said partially coded data array utilizing a Strong Mallat transformation applied to a dimension having a spectral distribution of energy concentrated at low frequencies.

4. The method of claim 1 wherein said step of sub-band coding comprises the step of applying a Weak Mallat transformation to all of said dimensions of said data array.

5. The method of claim 1 wherein said step of sub-band coding comprises the steps of applying a Weak Mallat transformation to said first and second dimensions to generate a partially coded dataset having first, second, and third dimensions corresponding to said first, second and third dimensions of the seismic dataset, respectively, and applying a Strong Mallat transformation to said third dimension of said partially coded dataset.

6. The method of claim 1 wherein said step of sub-band coding comprises the step of coding a first said dimension utilizing a Strong Mallat transformation to generate a partially coded data array, said first dimension having a spectral distribution of energy concentrated in the lower frequencies.

7. The method of claim 1 wherein said step of sub-band coding comprises the step of coding at least two dimensions utilizing a Weak Mallat transformation to generate a partially-coded data array, each said coded dimension having a broadband spectral distribution of energy.

8. The method of claim 1 wherein said step of sub-band coding comprises the step of applying a Strong Mallat transformation to at least two of said data array dimensions.

* * * * *